(12) United States Patent
Wong et al.

(10) Patent No.: US 12,241,537 B2
(45) Date of Patent: Mar. 4, 2025

(54) RECEIVING DISK FOR SEGMENTED PULLEY TRANSMISSION AND SEGMENTED PULLEY TRANSMISSION INCLUDING THE SAME

(71) Applicant: 1783590 Ontario Inc., Toronto (CA)

(72) Inventors: Anthony Wong, Scarborough (CA); Jaroslaw Lutoslawski, Bradford (CA)

(73) Assignee: 1783590 Ontario Inc., Toronto (CA)

( * ) Notice: Subject to any disclaimer, the term of this patent is extended or adjusted under 35 U.S.C. 154(b) by 66 days.

(21) Appl. No.: 17/619,644

(22) PCT Filed: Nov. 29, 2019

(86) PCT No.: PCT/CA2019/051714
§ 371 (c)(1),
(2) Date: Dec. 16, 2021

(87) PCT Pub. No.: WO2020/252558
PCT Pub. Date: Dec. 24, 2020

(65) Prior Publication Data
US 2022/0299098 A1 Sep. 22, 2022

Related U.S. Application Data

(60) Provisional application No. 62/864,200, filed on Jun. 20, 2019.

(51) Int. Cl.
*F16H 55/12* (2006.01)
*F16H 9/24* (2006.01)
*F16H 55/17* (2006.01)

(52) U.S. Cl.
CPC .............. *F16H 55/12* (2013.01); *F16H 9/24* (2013.01); *F16H 55/171* (2013.01)

(58) Field of Classification Search
CPC .. B62M 9/14; F16H 9/24; F16H 55/54; F16H 55/56
(Continued)

(56) References Cited

U.S. PATENT DOCUMENTS 1,044,535 A 11/1912 Percy
1,428,999 A 9/1922 James
(Continued)

FOREIGN PATENT DOCUMENTS

CN 102494093 6/2012
DE 817985 C 10/1951
(Continued)

OTHER PUBLICATIONS

International Search Report and Written Opinion issued by the ISA/CA, Canadian Intellectual Property Office, dated Mar. 17, 2020, for International Application No. PCT/CA2019/051714; 11 pages.
(Continued)

*Primary Examiner* — Henry Y Liu
(74) *Attorney, Agent, or Firm* — Faegre Drinker Biddle & Reath LLP

(57) ABSTRACT

A receiving disk for a segmented pulley transmission is provided. The receiving disk comprises: a generally circular body having a pulley facing side and a rear side, opposite the pulley facing side; at least one mating feature located at the pulley facing side of the body, the mating feature being configured to engage a complimentary mating feature, which is secured to a pulley segment of the segmented pulley transmission, when the pulley segment is in an engaged region; and at least one securing feature located in proximity to the mating feature and configured to secure the complimentary mating feature, when the complimentary mating feature is engaged with the mating feature. A seg-
(Continued)

mented pulley transmission comprising the receiving disk is further provided.

15 Claims, 5 Drawing Sheets

(58) Field of Classification Search
USPC ............................................ 474/47, 49
See application file for complete search history.

(56) References Cited

U.S. PATENT DOCUMENTS

| | | | |
|---|---|---|---|
| 1,662,037 A | 3/1928 | Wichtendahl | |
| 4,024,772 A | 5/1977 | Kumm | |
| 4,457,739 A * | 7/1984 | Iseman ................... | F16H 55/54 474/69 |
| 5,205,794 A * | 4/1993 | Browning ................ | B62M 9/14 474/160 |
| 5,443,423 A | 8/1995 | Ha | |
| 5,637,046 A | 6/1997 | Ha | |
| 6,267,699 B1 * | 7/2001 | Gruich ..................... | B62M 9/14 474/49 |
| 8,083,621 B1 * | 12/2011 | Lane ........................ | B62M 9/08 474/70 |
| 8,257,209 B1 * | 9/2012 | Lane ........................ | F16H 9/10 474/70 |
| 8,753,236 B2 * | 6/2014 | Wong ....................... | F16H 9/24 474/47 |
| 9,625,014 B2 | 4/2017 | Wong | |
| 9,816,598 B2 * | 11/2017 | Wong ....................... | F16H 9/06 |
| 10,988,207 B1 * | 4/2021 | Earle ....................... | B62M 25/08 |
| 10,989,281 B2 * | 4/2021 | Allen ....................... | B62M 9/10 |
| 11,214,333 B2 * | 1/2022 | Zubieta Andueza .... | B62M 9/14 |
| 11,279,441 B2 * | 3/2022 | Zubieta Andueza .... | B62M 9/12 |
| 11,572,131 B2 * | 2/2023 | Allen ....................... | B62M 25/04 |
| 11,661,145 B2 * | 5/2023 | Schuster ................. | B62M 9/08 477/47 |
| 11,685,468 B2 * | 6/2023 | Zubieta Andueza .... | B62M 9/12 474/156 |
| 2002/0084618 A1 | 7/2002 | Lerman | |
| 2011/0045928 A1 * | 2/2011 | Wong ....................... | F16H 9/04 474/47 |
| 2013/0267362 A1 * | 10/2013 | Gheciu ................... | B62M 9/105 474/164 |
| 2014/0155207 A1 * | 6/2014 | Wong ....................... | F16H 9/24 474/163 |
| 2014/0248982 A1 * | 9/2014 | Schuster ................. | B62M 9/06 474/69 |
| 2016/0040772 A1 * | 2/2016 | Appleton ................ | F16H 55/54 474/55 |
| 2016/0169363 A1 * | 6/2016 | Wong ....................... | F16H 9/24 474/69 |
| 2017/0283006 A1 * | 10/2017 | Schuster ................. | F16H 55/54 |
| 2018/0231108 A1 * | 8/2018 | Akbari Rostami ....... | F16H 9/10 |
| 2020/0263767 A1 * | 8/2020 | Allen ....................... | F16H 9/24 |
| 2020/0377174 A1 * | 12/2020 | Allen ....................... | B62M 9/14 |
| 2021/0003201 A1 * | 1/2021 | Wong ....................... | F16H 55/12 |
| 2021/0031877 A1 * | 2/2021 | Zubieta Andueza .. | B62M 9/105 |
| 2021/0031878 A1 * | 2/2021 | Zubieta Andueza .... | B62M 9/12 |
| 2021/0031879 A1 * | 2/2021 | Zubieta Andueza .... | B62M 9/14 |

FOREIGN PATENT DOCUMENTS

| | | |
|---|---|---|
| DE | 3107255 A1 | 9/1982 |
| DE | 102012008041 A1 | 10/2013 |
| FR | 960014 A | 4/1950 |
| FR | 2797670 A1 | 2/2001 |
| WO | 0127500 A1 | 4/2001 |

OTHER PUBLICATIONS

PCT International Preliminary Report on Patentability for PCT/CA2019/051714, Dated Dec. 21, 2021.

* cited by examiner

RECEIVING DISK FOR SEGMENTED PULLEY TRANSMISSION AND SEGMENTED PULLEY TRANSMISSION INCLUDING THE SAME

CROSS-REFERENCE TO RELATED APPLICATIONS

This application is related to U.S. Provisional Patent Application No. 62/845,376, filed on May 9, 2019, and titled SEGMENTED PULLEY AND SEGMENTED PULLEY TRANSMISSION INCLUDING THE SAME, to U.S. Provisional Patent Application No. 62/845,389, filed on May 9, 2019, and titled ACTUATOR SYSTEM AND SEGMENTED PULLEY TRANSMISSION INCLUDING THE SAME, and to the PCT International Applications titled the same. This application claims the benefit of U.S. Provisional Patent Applications No. 62/864,200 filed on Jun. 20, 2019, and titled RECEIVING DISK FOR SEGMENTED PULLEY TRANSMISSION AND SEGMENTED PULLEY TRANSMISSION INCLUDING THE SAME, the entirety of which is incorporated herein by reference.

FIELD

The subject disclosure generally relates to transmissions, and more particularly to a receiving disk for a segmented pulley transmission and to a segmented pulley transmission including the same.

BACKGROUND

Transmissions are well known and can be used to change the ratio between rotating elements in a power train. Potential applications for transmissions are numerous and include motor vehicles, human-powered vehicles, maritime craft and heavy machinery, such as pumps, turbines, mixers, winches, centrifuges and shredders.

Clutchless multi-ratio transmissions allow the ratio between rotating elements to be changed while the transmission is under load. Certain mechanical problems can affect clutchless multi-ratio transmissions that limit their widespread utilization; specifically, the ability of such transmissions to function at high speeds or under significant loads effectively and efficiently in practical applications. In addition, ratcheting, slippage, and tensioning problems can limit the commercial viability of such transmissions by decreasing their reliability, decreasing their efficiency and increasing wear. Accordingly, segmented pulley transmissions have been developed to reduce or alleviate at least some of these mechanical problems.

For example, U.S. Pat. No. 8,753,236 to Wong et al. discloses a segmented pulley transmission, wherein a pulley assembly is mounted on an axle. The pulley assembly includes a core pulley having a first set of mating features on a peripheral surface thereof and a pulley segment set that comprises a number of pulley segments slidably mounted in the pulley assembly and arranged in a ring concentric with the core pulley. The pulley segments are individually actuatable into and out of the pulley assembly. The pulley segments have a second set of mating features on a peripheral surface matching the first set of mating features. An endless drive member has corresponding mating features on an inside surface for engaging the first and second sets of mating features of the core pulley and the pulley segments in an engaging position. Contact between the endless drive member and the core pulley defines a contact zone. An actuator actuates the pulley segments between the engaging and non-engaging positions when the pulley segments are outside of the contact zone.

U.S. Pat. No. 9,816,598 to Wong discloses a key pulley segment for a segmented pulley transmission that is either first or last in a pulley segment set to engage an endless member. The first or last key segment teeth to engage or disengage the endless member, respectively, are shortened or completely trimmed, and the adjacent pulley segment to the key segment is elongated such that a portion of the tooth profile extends toward the key segment. The shortened tooth or teeth and elongated adjacent segment together allow for many pulley segments to be designed as key segments. Completely trimmed teeth may be engineered to create a supporting surface for the endless member on the key segment. The elongated adjacent segment may have an extending portion which slidably mates with the supporting surface of the key segment, thereby receiving radial support therefrom. Multiple pulley segments from different pulley segment sets may be connected or constructed to move together in a unified stack. Unified stacks may be moved by way of a cam or roller-cam system. Chassis-mounted cams engage the rollers outside of the contact zone and, via roller-arms, individual segments of a unified stack are moved into or out of engagement. Rollers may be actuated into and out of engagement with the cams by electromagnets, fixably mounted in an array.

While the contributions of known segmented pulley transmissions are laudable, improvements and/or alternatives are generally desired. It is therefore an object to provide a novel receiving disk for a segmented pulley transmission and a novel segmented pulley transmission including the same.

SUMMARY

It should be appreciated that this summary is provided to introduce a selection of concepts in a simplified form that are further described below in the detailed description of embodiments. This summary is not intended to be used to limit the scope of the claimed subject matter.

Accordingly, in one aspect there is provided a receiving disk for a segmented pulley transmission, the receiving disk comprising: a generally circular body having a pulley facing side and a rear side, opposite the pulley facing side; at least one mating feature located at the pulley facing side of the body, the mating feature being configured to engage a complimentary mating feature associated with a pulley segment of the segmented pulley transmission, when the pulley segment is in an engaged region; and at least one securing feature located in proximity to the mating feature and configured to secure the complimentary mating feature, when the complimentary mating feature is engaged with the mating feature.

In one or more embodiments, the mating feature may comprise a hole formed in the body that extends from the pulley facing side to the rear side.

In one or more embodiments, the mating feature may define at least one indexing surface for engaging the complimentary mating feature. The indexing surface may be configured to contact the complimentary mating feature and align the pulley segment in the engaged region. The securing feature may be configured to bias the complimentary mating feature towards the indexing surface to secure the complimentary mating feature. The securing feature may bias the complimentary mating feature towards the indexing surface in at least one of a generally radially inward direction and a generally circumferentially forward direction. The securing feature may comprise at least one biasing member for basing the pulley segment towards the indexing surface. The biasing member may comprise at least one of a spring and an elastic member.

In one or more embodiments, the securing feature may be integrally formed with the mating feature.

In one or more embodiments, the complimentary mating feature may be integrally formed on a surface of the pulley segment.

In one or more embodiments, the complimentary mating feature may be coupled to the pulley segment. The complimentary mating feature may be located on connecting structure that is coupled to the pulley segment. The connecting structure may comprise a connecting rod that is secured to the pulley segment and the complimentary mating feature may be a distal tip of the connecting rod.

In one or more embodiments, the receiving disk may comprise a plurality of the mating features configured to engage a plurality of the complimentary mating feature associated with a plurality of the pulley segments of the segmented pulley transmission. The receiving disk may comprise a plurality of the securing features and each of the securing features may be located in proximity to a respective one of the mating features in the plurality of mating features.

According to another aspect, there is provided a segmented pulley transmission for rotationally coupling a first rotatable member and a second rotatable member, the segmented pulley transmission comprising: a first pulley assembly for coupling to the first rotatable member, the first pulley assembly comprising a first pulley and a second pulley concentric with the first pulley, the second pulley being a segmented pulley having a plurality of pulley segments that are individually moveable between an engaged region and a disengaged region; a second pulley assembly for coupling to the second rotatable member and spaced apart from the first pulley assembly; an endless member engaging the first pulley assembly and the second pulley assembly and extending therebetween, to rotationally couple the first pulley assembly and the second pulley assembly; and a receiving disk as defined in any of the above paragraphs of this Summary for engaging and securing the plurality of pulley segments, when the pulley segments are located in the engaged region.

In one or more embodiment, the segmented pulley transmission may further comprise an idler pulley engaging the endless member and configured to control slack in the endless member.

In one or more embodiment, the segmented pulley transmission may further comprise an actuator coupled to the plurality of pulley segments and configured to sequentially move the plurality of pulley segments between the engaged region and the disengaged region, to transition the endless member between the first pulley and the second pulley.

BRIEF DESCRIPTION OF THE DRAWINGS

Embodiments will now be described more fully with reference to the accompanying drawings, in which.

DETAILED DESCRIPTION OF EMBODIMENTS

Figure 1:
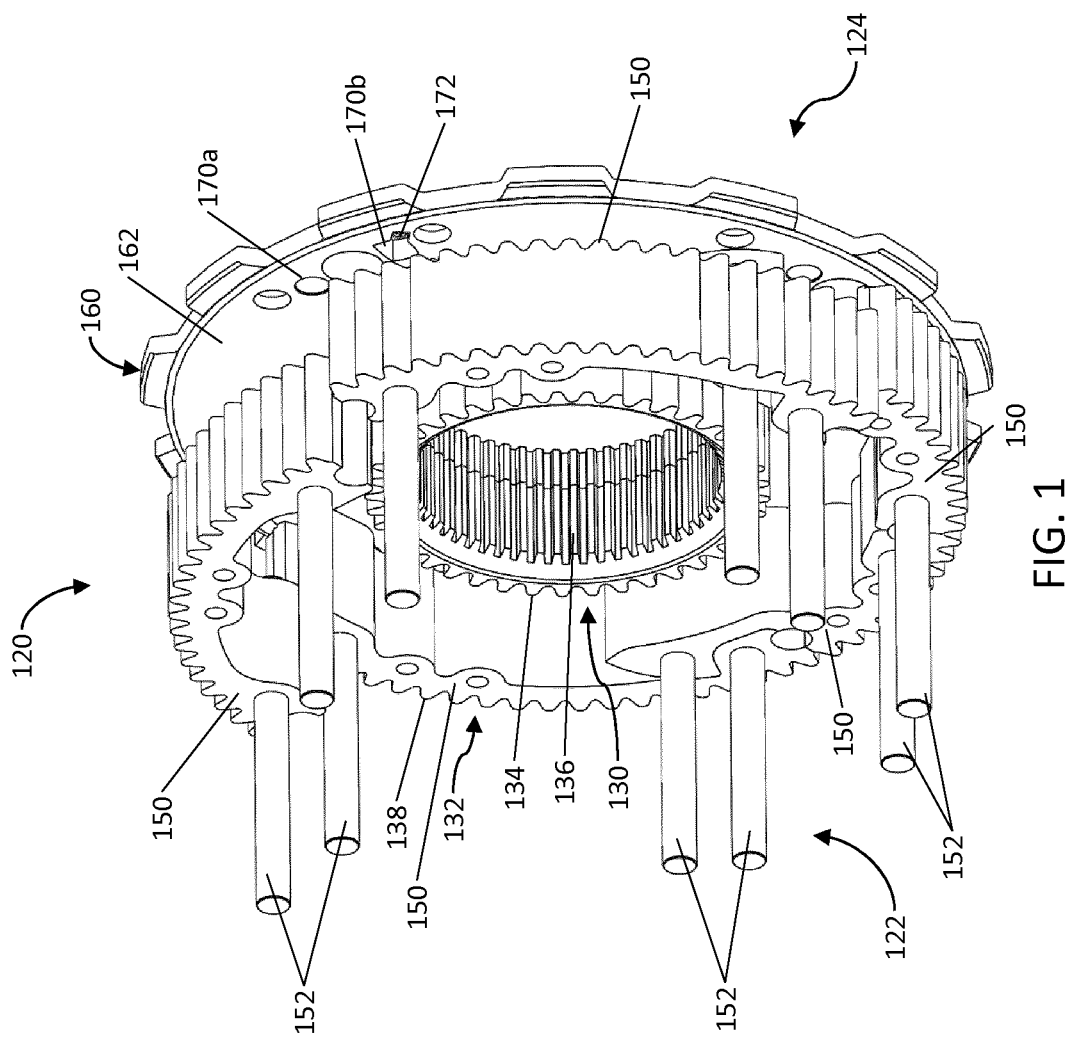
FIG. 1 is an axonometric view of a pulley assembly, connecting structure and a receiving disk for a segmented pulley transmission, showing one pulley segment of the segmented pulley transmission in a disengaged region and another pulley segment transitioning between the disengaged region and an engaged region.

The foregoing summary, as well as the following detailed description of certain embodiments will be better understood when read in conjunction with the accompanying drawings. As used herein, an element or feature in the singular and preceded by the word "a" or "an" should be understood as not necessarily excluding a plural of the elements or features. Further, references to "one example" or "one embodiment" are not intended to be interpreted as excluding the existence of additional examples or embodiments that also incorporate the described elements or features of that one example or one embodiment. Moreover, unless explicitly stated to the contrary, examples or embodiments "comprising," "having" or "including" an element or feature or a plurality of elements or features having a particular property may further include additional elements or features not having that particular property. Also, it will be appreciated that the terms "comprises," "has" and "includes" mean "including but not limited to" and the terms "comprising," "having" and "including" have equivalent meanings.

As used herein, the term "and/or" can include any and all combinations of one or more of the associated listed elements or features.

It will be understood that when an element or feature is referred to as being "on," "attached" to, "connected" to, "coupled" with, "engaged" with, "contacting," etc. another element or feature, that element or feature can be directly on, attached to, connected to, coupled with, engaged with or contacting the other element or feature or intervening elements may also be present. In contrast, when an element or feature is referred to as being, for example, "directly on," "directly attached" to, "directly connected" to, "directly coupled" with, "directly engaged" with or "directly contacting" another element of feature, there are no intervening elements or features present. Additionally, when an element or feature is referred to as being "attached" to, "connected" to, "coupled" with, "engaged" with, "contacting," etc. another element or feature, it should be understood as not necessarily excluding further elements or features being attached to, connected to, couple with, engaged with, contacting, etc. those same elements or features. For example, in some instances, elements may be coupled in a one-to-one relationship; in other instances, a single element may be coupled to a plurality of other elements, or vice versa.

It will be understood that spatially relative terms, such as "under," "below," "lower," "over," "above," "upper," "front," "back" and the like, may be used herein for ease of describing the relationship of an element or feature to another element or feature as depicted in the figures. The spatially relative terms can however, encompass different orientations in use or operation in addition to the orientation depicted in the figures.

Reference herein to "example" means that one or more feature, structure, element, component, characteristic and/or operational step described in connection with the example is included in at least one embodiment and/or implementation of the subject matter according to the subject disclosure. Thus, the phrases "an example," "another example," and similar language throughout the subject disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to."

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of a lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within engineering tolerances that would be readily appreciated by a person skilled in the art.

Figure 5:
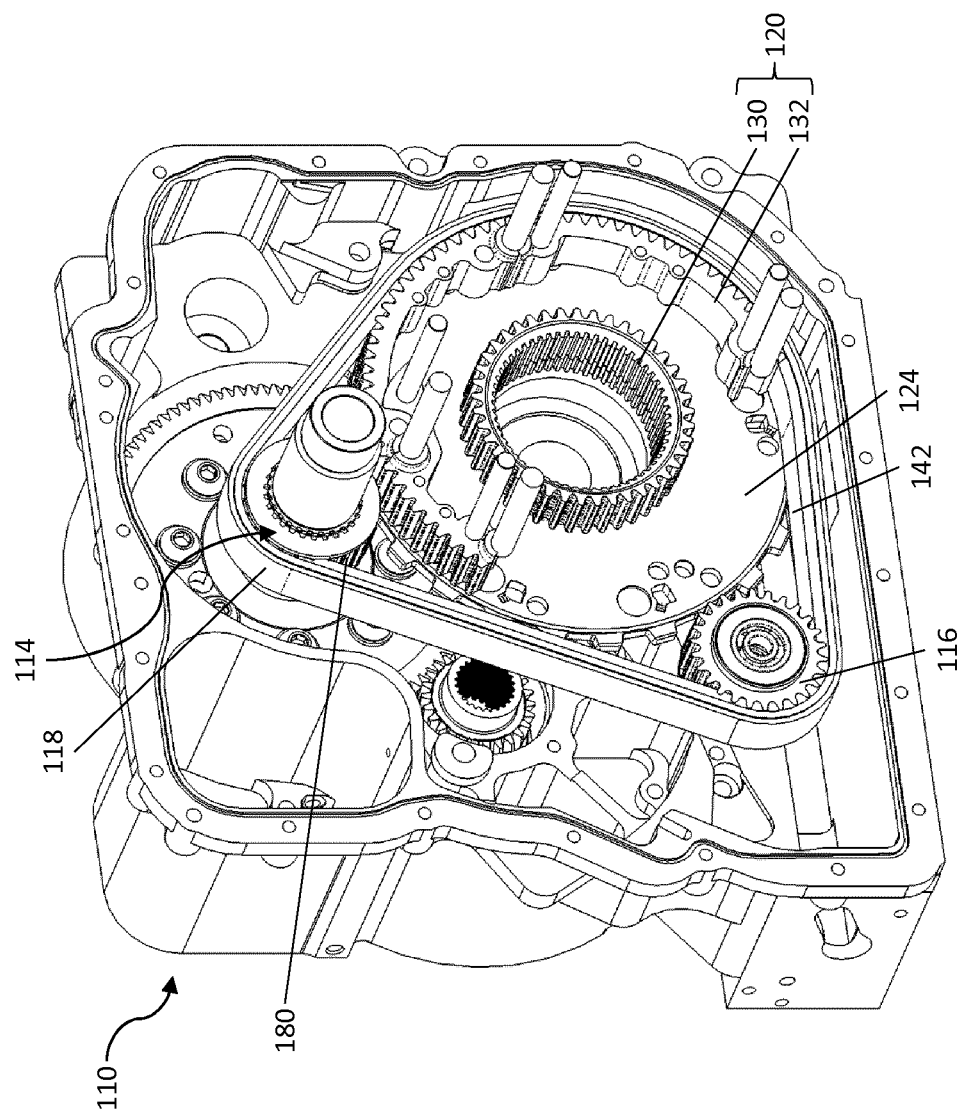
FIG. 5 is an axonometric view of the segmented pulley transmission, with a portion of the external housing and two of the pulley segments omitted.

FIG. 5 shows a segmented pulley transmission generally identified by reference character 110. As will be appreciated, a portion of an external housing of the segmented pulley transmission 110 has been omitted in FIG. 5 to view the interior, as have a pair of pulley segments and respective connecting structure, as described below. In some embodiments, the segmented pulley transmission 110 may include elements shown and described in PCT International Application No. PCT/CA2018/051475 filed on Nov. 20, 2018, and titled PULLEY ASSEMBLY FOR A SEGMENTED PULLEY TRANSMISSION AND ACTUATOR SYSTEM FOR THE SAME, the relevant portions of which are incorporated herein by reference.

The segmented pulley transmission 110 is configured to rotationally couple a first rotating element and a second rotating element in a power train (not shown) and is configured to change the ratio between the first and second rotating elements. In some embodiments, the first rotating element is a driven axle in the power train and the second rotating element is a driving axle in the power train, or vice versa. The segmented pulley transmission 110 comprises a first pulley assembly 120, a second pulley assembly 114, an idler pulley 116 and an endless member 118. The segmented pulley transmission 110 further comprises a connecting structure 122 and a receiving disk 124. As will be appreciated, the endless member 118 is shown as a schematic representation with mating features omitted in FIG. 5. The first pulley assembly 120, the second pulley assembly 114 and the idler pulley 116 are all spaced apart from each other. The endless member 118 extends between and rotationally couples the first pulley assembly 120, the second pulley assembly 114 and the idler pulley 116. During installation of the segmented pulley transmission 110, the first pulley assembly 120 is coupled to the first rotating element in the power train and the second pulley assembly 114 is coupled to the second rotating element in the power train. As will be appreciated, in some embodiments, the segmented pulley transmission 110 may further include one or more actuators, as described below.

Figure 2:
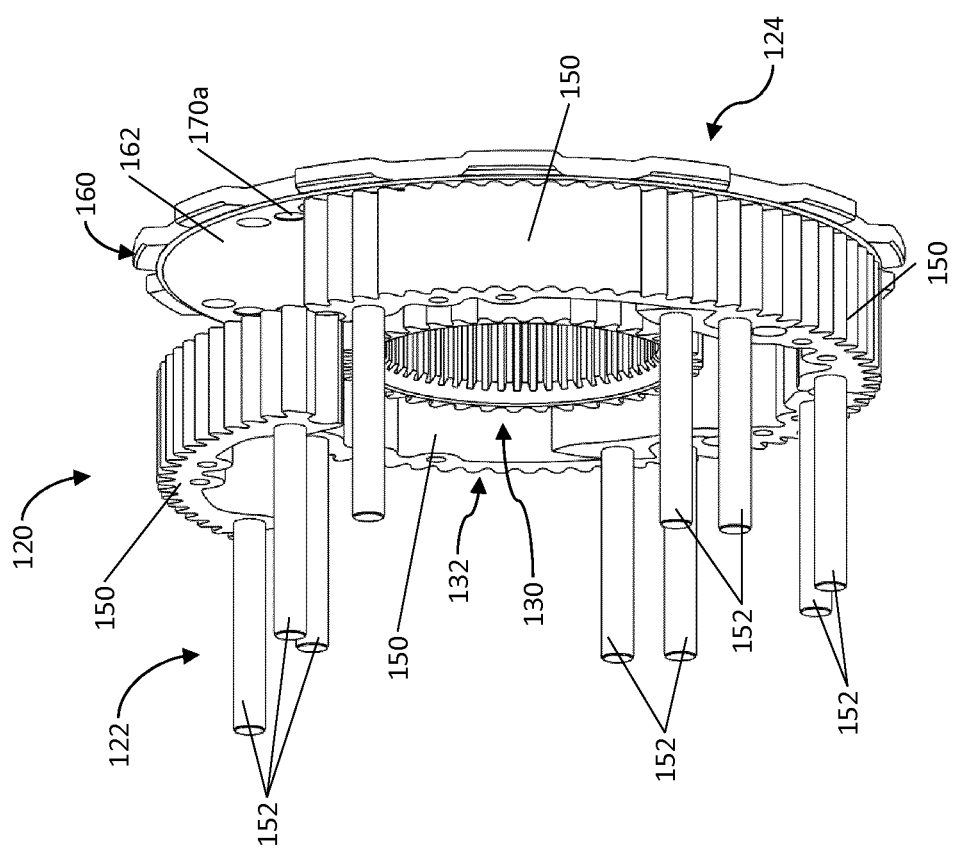
FIG. 2 is an axonometric view of the pulley assembly, the connecting structure and the receiving disk of FIG. 1, showing the other pulley segment fully transitioned to the engaged region.
Figure 3:
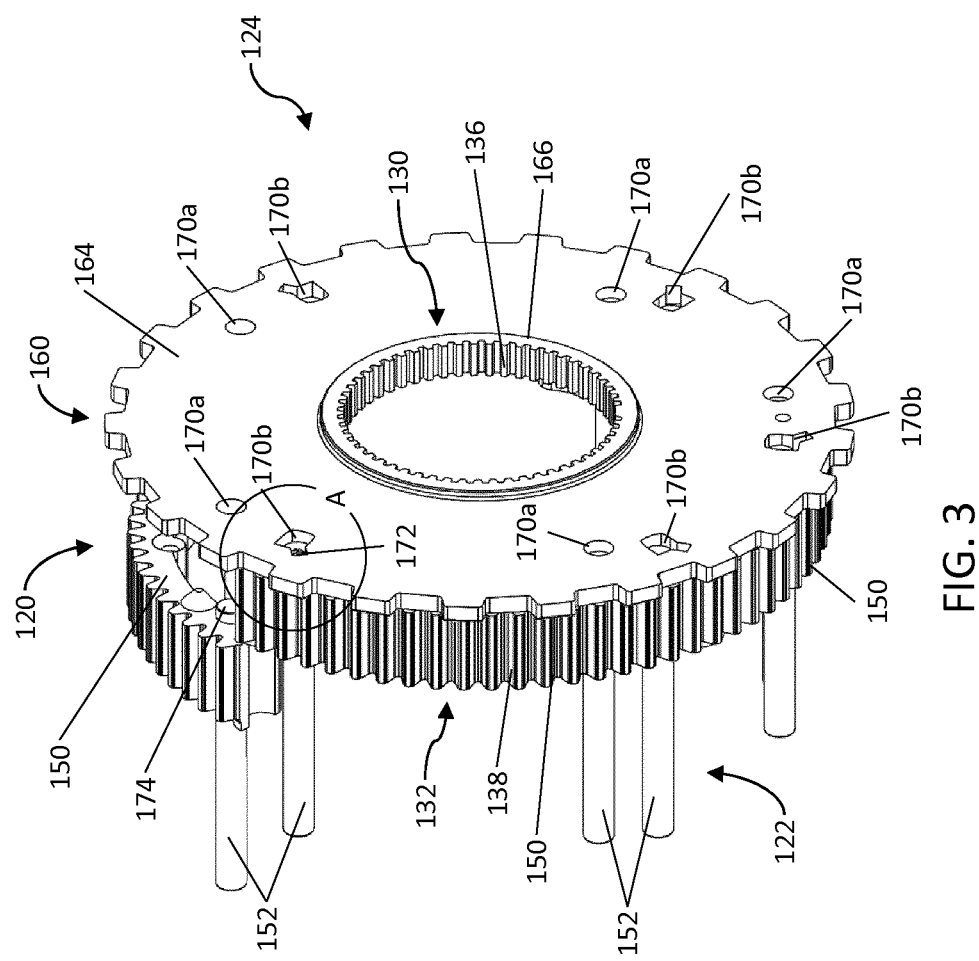
FIG. 3 is an axonometric view of the pulley assembly, the connecting structure and the receiving disk of FIG. 2, showing a rear side of the receiving disk.

FIGS. 1 to 3 shows the first pulley assembly 120, the connecting structure 122 and the receiving disk 124 of the segmented pulley transmission 110. The connecting structure 122 extends from the first pulley assembly 120, opposite the receiving disk.

The first pulley assembly 120 is configured to be coupled to the first rotating element in the power train. In some embodiments, the first pulley assembly 120, or a portion thereof, is integrally formed with the first rotating element in the power train. The first pulley assembly 120 is configured to engage the endless member 118 during rotational operation of the segmented pulley transmission 110. The first pulley assembly 120 is rotatable about and concentric with a first axis of rotation. The first pulley assembly 120 comprises a first pulley 130 and a second pulley 132. Both the first pulley 130 and the second pulley 132 are configured for continuous rotational operation with the endless member 118. During a full rotation of the first pulley assembly 120 about the first axis of rotation, either of the first pulley 130 and the second pulley 132 may continuously engage the endless member 118. The second pulley 132 is concentric with the first pulley 130 and is movable between an engaged region and a disengaged region, as described below. The second pulley 132 is configured to surround the first pulley 130, when located in the engaged region.

In the context of the subject disclosure, the "engaged region" is a region wherein elements of the first pulley assembly 120 will engage the endless member 118 during rotational operation of the first pulley assembly 120, when those elements are unsheltered or unobstructed by other elements of first pulley assembly 120. In contrast, the "disengaged region" is a region wherein elements of the first pulley assembly 120 will not engage the endless member 118 during rotational operation of the first pulley assembly 120, regardless of their exposure or the position of the other elements of the first pulley assembly 120. In the subject embodiment, the engaged region is directly adjacent the receiving disk 124 and the disengaged region is spaced apart from the receiving disk 124. Accordingly, it will be appreciated that the first pulley 130 is permanently located within the engaged region, as the first pulley 130 will always engage the endless member 118 when unobstructed by other elements during rotational operation of the first pulley assembly 120. In contrast, the second pulley 132 will only be located in the engaged region when moved directly adjacent the receiving disk 124 and into a plane defined by the endless member 118.

The first pulley 130 is configured to be coupled to the first rotating element in the power train. In some embodiments, the first pulley 130 is integrally formed with the first rotating element in the power train. The first pulley 130 is configured to engage the endless member 118, when the first pulley 130 is located in the engaged region. The first pulley 130 is rotatable about and concentric with the first axis of rotation of the first pulley assembly 120. The first pulley 130 includes an outer peripheral surface 134 for engaging the endless member 118. The outer peripheral surface 134 is generally circular and may comprise a plurality of outer mating features, for engaging corresponding mating features on the endless member 118. In some embodiments, the outer mating features are teeth. The first pulley 130 further comprises an inner peripheral surface 136 that is configured to be coupled to the first rotating element of the power train. The inner peripheral surface 136 is generally circular and may comprise a plurality of inner mating features, for coupling to the first rotating element in the power train. In some embodiments, the inner mating features are at least one of keys, teeth or the like. In the subject embodiment, the first pulley 130 comprises a unitary construction. In the subject embodiment, the first pulley 130 is a core pulley of the first pulley assembly 120. That is, the first pulley 130 is the centermost or smallest diameter pulley in the first pulley assembly 120. In other embodiments, the first pulley 130 may be another pulley in the first pulley assembly 120, such as an intermediate pulley that is located between two concentric pulleys in the first pulley assembly 120. In other embodiments, the first pulley 130 may be a segmented pulley.

The second pulley 132 is configured to be coupled to the first rotating element in the power train. The second pulley 132 is configured to engage the endless member 118, when the second pulley 132 is located in the engaged region. The second pulley 132 is rotatable about and concentric with the first axis of rotation of the first pulley assembly 120. The second pulley 132 includes an outer peripheral surface 138 for engaging the endless member 118. The outer peripheral surface 138 is generally circular and may comprise a plurality of mating features, for engaging corresponding mating features on the endless member 118. In some embodiments, the outer mating features are teeth. The second pulley 132 is a segmented pulley and comprises a plurality of pulley segments 150. The pulley segments 150 are circularly arranged to form the second pulley 132.

The plurality of pulley segments 150 is configured to engage the endless member 128. Accordingly, each of the pulley segments 150 includes a body that defines a portion of the outer peripheral surface 138 of the second pulley 132. The pulley segments 150 are configured to be sequentially movable between the engaged region and the disengaged region to transition the endless member 118 between the first pulley 130 and the second pulley 132. In the subject embodiment, the pulley segments 150 are configured to be individually movable between the engaged region and the disengaged region. In other embodiments, one or more subsets of the pulley segments 150 are configured to be collectively moved between the engaged region and the disengaged region. For example, in some embodiments, two or more of the pulley segments 150 are configured to be movable together between the engaged region and the disengaged region. In some embodiments, the plurality of pulley segments 150 are moved between the engaged region and the disengaged region by one or more actuators, such as those described in PCT International Application No. PCT/CA2018/051475. In some embodiments, the plurality of pulley segments 150 are moved by the actuator system shown and described in U.S. Provisional Patent Application No. 62/845,389 filed on May 9, 2019, and titled ACTUATOR SYSTEM AND SEGMENTED PULLEY TRANSMISSION INCLUDING THE SAME and/or in the PCT International Application of the same title, the entireties of which are all incorporated herein by reference.

The connecting structure 122 is configured to couple at least part of the first pulley assembly 120 to the first rotating element in the power train. In the subject embodiment, the connecting structure 122 is configured to couple the second pulley 132 of the first pulley assembly 120 to the first rotating element in the power train. In some embodiments, the connecting structure 122 may be configured to couple the second pulley 132 to the first rotating element through an actuator system for moving the pulley segments 150 between the engaged and the disengaged region, such as the actuator system shown and described in PCT International Application No. PCT/CA2018/051475 or U.S. Provisional Patent Application No. 62/845,389. The connecting structure 122 may be configured to provide support for the pulley segments 150 of the second pulley 132, such as through a support structure as shown and described in PCT International Application No. PCT/CA2018/051475.

The connecting structure 122 comprises a plurality of connecting rods 152. At least one connecting rod 152 is secured to each of the pulley segments 150, and is movable with the secured pulley segment 150 between the engaged region and the disengaged region. In the subject embodiment, two connecting rods 152 are secured to each of the pulley segments 150; one of the connecting rods 152 is located adjacent a forward end of the pulley segment 150 and the other of the connecting rods 152 is located adjacent a rearward end of the pulley segment 150, opposite the forward end. Each of the connecting rods 152 is received within a corresponding passage defined in the pulley segment 150 to which the connecting rod 152 is secured. In the subject embodiment, the connecting rods 152 pass through the pulley segments 150. A distal tip of each of the connecting rods 152 extends beyond a side of the pulley segments 150 that faces the receiving disk 124 and defines a complementary mating feature 174 as will be described below. The distal tips are configured to engage the receiving disk 124 when the pulley segments 150 are in the engaged region, as will be described below.

The receiving disk 124 is configured to engage at least part of the first pulley assembly 120. In the subject embodiment, the receiving disk 124 is configured to continuously engage the first pulley 130 of the first pulley assembly 120 and is further configured to engage the pulley segments 150 of the second pulley 132, when the pulley segments 150 are located in the engaged region. The receiving disk 124 comprises a generally circular body 160 having a pulley facing side 162 (shown in FIGS. 1 and 2) and an opposite rear side 164 (shown in FIG. 3). In the subject embodiment, the body 160 of the receiving disk 124 defines a central opening 166, which is configured to engage the first pulley 130 of the first pulley assembly 120. In other embodiments, the receiving disk 124 may not include a central opening and the first pulley 130 may engage the pulley facing side 162 of the receiving disk 124, or may not engage the receiving disk 124 at all. In some embodiments, the receiving disk 124 is configured to be coupled to the first rotating element in the power train. For example, in some embodiments, the receiving disk 124 may include features that are configured to couple the receiving disk 124 to the driven axle in the power train. These features may include dowels, splines, keys or other suitable indexing features.

The receiving disk 124 further comprises a plurality of mating features 170a, 170b and a plurality of securing features 172 (shown in FIG. 3). The mating features 170a, 170b are located at the pulley facing side 162 of the body 160. In the subject embodiment, the mating features 170a, 170b are holes that extend from the pulley facing side 162 of the body 160 through to the rear side 164 of the body 160. Each of the securing features 172 is located in proximity to a respective one of the mating features 170b. In the subject embodiment, each of the securing features 172 adjoins the respective one of the mating features 170b. In other embodiments, the securing features 172 may be located on the rear side 164 of the body 160, in proximity to at least one of the mating features 170a, 170b.

The mating features 170a, 170b are configured to engage complimentary mating features 174 associated with the pulley segments 150 of the second pulley 132. It will be appreciated that each of the complimentary mating features 174 is associated with one of the pulley segments 150 by being coupled to that pulley segment 150, and/or by moving with that pulley segment 150 between the engaged region and the disengaged region. The mating features 170a, 170b are configured to engage the complimentary mating features 174 when the associated pulley segments 150 are in the engaged region. In the subject embodiment, the complimentary mating features 174 are the distal tips of the connecting rods 152 that are secured to the pulley segments 150. In other embodiments, the complimentary mating features 174 may be other elements that are secured to the pulley segments 150. In some embodiments, the complimentary mating features 174 are integrally formed on the sides of the pulley segments 150 facing the receiving disk 124. For example, the complimentary mating features 174 may be protrusions formed on the pulley segments 150 and extending towards the receiving disk 124. The mating features 170a, 170b may be identical, or may comprise a plurality of different configurations. In the subject embodiment, the receiving disk 124 includes ten mating features 170a, 170b in total. As shown in FIG. 3, five of the mating features are identical to each other and generally identified by reference character 170a. The remaining five mating features are also identical to each other but are of a different configuration than the mating features 170a. These five remaining mating features are generally identified by reference character 170b.

Each of the mating features 170a comprises a generally circular hole that is configured to receive and engage one of the complimentary mating features 174, as the associated pulley segment 150 is moved into the engaged region. Accordingly, each of the mating features 170a is defined in the body 160 of the receiving disk 124 at a position that is aligned with one of the complimentary mating features 174.

Figure 4:
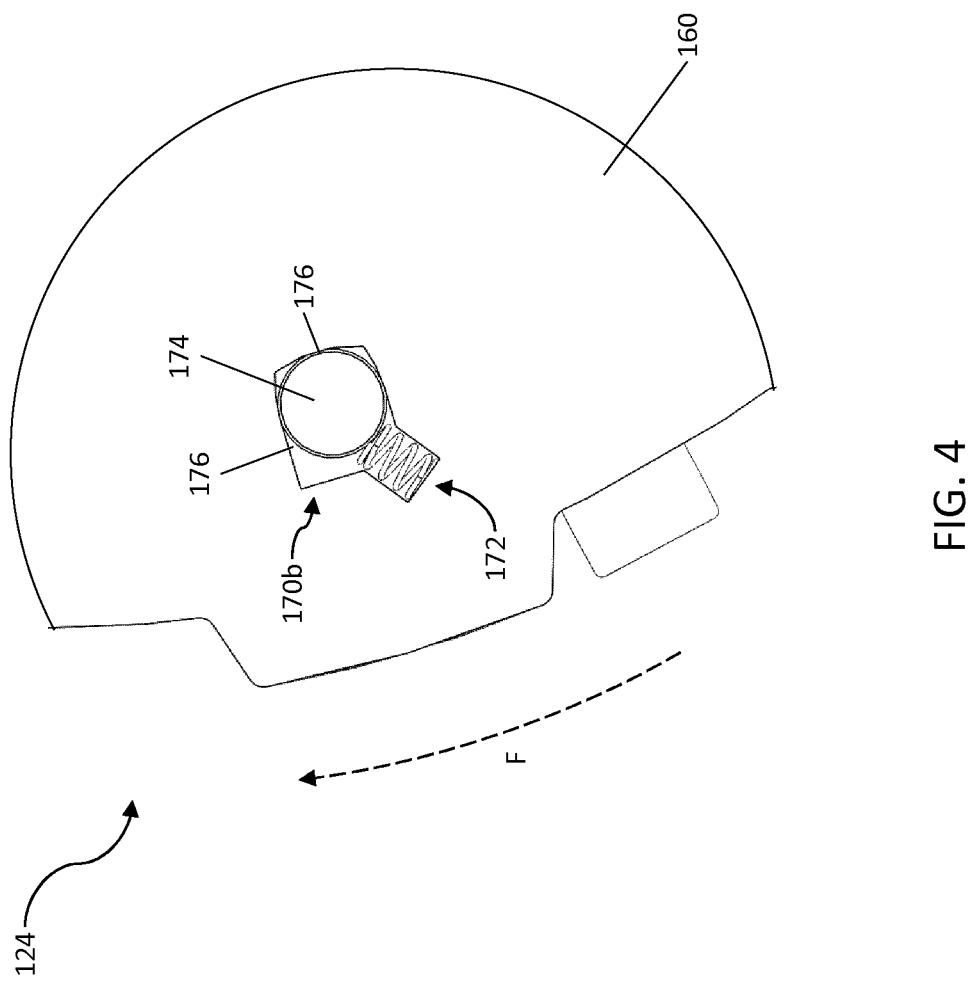
FIG. 4 is an enlarged fragmentary view of the receiving disk of FIG. 3, showing detail A in FIG. 3.

Each of the mating features 170b comprises a generally rectangular hole that is configured to receive and engage one of the complimentary mating features 174, as the associated pulley segment 150 is moved into the engaged region. Accordingly, each of the mating features 170b is defined in the body 160 of the receiving disk 124 at a position that is aligned with one of the complimentary mating feature 174. Each of the mating features 170b defines at least one indexing surface 176. In the subject embodiment, each of the mating features 170b defines a plurality of indexing surfaces 176 (as shown in FIG. 4). In the subject embodiment, the indexing surfaces 176 are substantially straight. In other embodiments, the indexing surfaces may be curved, multi-radially curved, completely straight, stepped or other suitable profiles. The indexing surfaces 176 are configured to contact the complimentary mating feature 174 and align the associated pulley segment 150 in the engaged region.

The securing feature 172 is configured to secure the complimentary mating feature 174, when the complimentary mating feature 174 is engaged with the mating feature 170b. In some embodiments, the securing feature 172 is configured to bias the complimentary mating feature 174 towards the indexing surfaces 176 of the mating feature 170b. In the subject embodiment, the securing feature 172 is configured to bias the complimentary mating feature towards the indexing surfaces 176 in a generally radially inward direction and a generally circumferentially forward direction (as shown in FIG. 4). As will be appreciated, the circumferentially forward direction is the direction in which the second pulley 132 rotates during operation of the segmented pulley transmission 110, as denoted by arrow F in FIG. 4. In the subject embodiment, the securing feature is integrally formed with the mating feature 170b. The securing feature 172 comprises a biasing member. In the subject embodiment, the biasing member is a spring, such as a leaf spring, a band spring or other suitable type of spring. In some embodiments, the band spring may extend between a plurality of the securing features 172. In yet other embodiments, the biasing member may be an elastic member, such as a rubber insert.

The second pulley assembly 114 is configured to be coupled to the second rotating element in the power train. In some embodiments, the second pulley assembly 114, or a portion thereof, is integrally formed with the second rotating element in the power train. The second pulley assembly 114 is configured to engage the endless member 118. The second pulley assembly 114 is rotatable about and concentric with a second axis of rotation. In the subject embodiment, the second pulley assembly 114 comprises a single fixed pulley 180. In other embodiments, the secondary pulley assembly 114 may be adjustable and may comprise a plurality of pulleys, such as the first pulley 130 and/or the second pulley 132 described above. The fixed pulley 180 is rotatable about and concentric with the second axis of rotation. The fixed pulley 180 includes an outer peripheral surface for engaging the endless member 118. The outer peripheral surface is generally circular and may comprise a plurality of outer mating features, for engaging corresponding mating features on the endless member 118. In some embodiments, the outer mating features are teeth. The fixed pulley 180 further comprises an inner peripheral surface that is configured to be coupled to the second rotating element of the power train (not shown). The inner peripheral surface is generally circular and, in some embodiments, comprises a plurality of inner mating features. In some embodiments, the inner mating features are at least one of keys, teeth and the like.

The idler pulley 116 is configured to control slack in the endless member 118 between the first pulley assembly 120 and the second pulley assembly 114. The idler pulley 116 is rotatable about and concentric with a third axis of rotation, which is movable within the segmented pulley transmission 110 to control slack in the endless member 118. As will be appreciated, controlling slack in the endless member 118 may help to control tension in the endless member 118 and/or may help to align the endless member 118 with the outer mating features of the first pulley assembly 120 and the second pulley assembly 114. The idler pulley 116 can be moved away from the first pulley assembly 120 and/or the second pulley assembly 114 to reduce slack in the endless member 118. Alternatively, the idler pulley 116 can be moved towards the first pulley assembly 120 and/or the second pulley assembly 114 to provide slack in the endless member 118. The idler pulley 116 is configured to engage the endless member 118. The idler pulley 126 includes an outer peripheral surface 192 for engaging the endless member 118. The outer peripheral surface 192 is generally circular and may comprise a plurality of outer mating features, for engaging corresponding mating features on the endless member 118. In some embodiments, the outer mating features are teeth.

The endless member 118 is configured to rotationally couple the first pulley assembly 120, the second pulley assembly 114 and the idler pulley 116. The endless member 118 extends between the first pulley assembly 120, the second pulley assembly 114 and the idler pulley 116. The endless member 118 includes an inner peripheral surface 142 that is configured to engage the outer peripheral surfaces 134, 138, 192 of the first pulley 130, the second pulley 132, the fixed pulley 180 and the idler pulley 116. Although the endless member 118 is shown in the figures as a schematic representation without any mating features, it will be appreciated that mating features such as teeth and/or holes may be included on at least the inner peripheral surface 192 of the endless member 118. In some embodiments, the inner peripheral surface 192 includes a plurality of complementary mating features for engaging the outer mating features on the outer peripheral surfaces 134, 138, 192. In other embodiments, the inner peripheral surface 192 may not include any mating features and may be generally smooth, and in such embodiments the inner peripheral surface 192 may engage the outer peripheral surface 134, 138, 192 by friction. As will be appreciated, the endless member 118 may comprise a chain, a belt or other suitable type of endless member.

During rotational operation of the segmented pulley transmission 110, the endless member 118 will contact and engage the first pulley assembly 120. By sequentially moving the pulley segments 150 into or out of the engaged region, the endless member 118 may transition from engaging one of the first pulley 130 and the second pulley 132, defined as an "origin pulley," to engaging the other of the first pulley 130 and the second pulley 132, defined as a "destination pulley," without interrupting rotational operation of the segmented pulley transmission 110 and without interrupting a load transmitted through the segmented pulley transmission 110. In some embodiments, the sequential processes for transitioning the endless member 118 between the first pulley 130 and the second pulley 132 may be the process that is shown and described in PCT International Application No. PCT/CA2018/051475. In some embodiments, the sequential processes for transitioning the endless member 118 between the first pulley 130 and the second pulley 132 may be the process that is shown and described in U.S. Provisional Patent Application No. 62/845,376 filed on May 9, 2019, and titled SEGMENTED PULLEY AND SEGMENTED PULLEY TRANSMISSION INCLUDING THE SAME, U.S. Provisional Patent Application No. 62/845,389 filed on May 9, 2019, and titled ACTUATOR SYSTEM AND SEGMENTED PULLEY TRANSMISSION INCLUDING THE SAME, and/or the PCT International Applications titled the same, respectively, the entireties of which are all incorporate herein by reference.

When the second pulley 132 is located in the engaged region during rotational operation of the segmented pulley transmission 110, each of the pulley segments 150 will rotate into and out of contact with the endless member 118. This periodic contact with the endless member 118 and rotational motion of the pulley segments 150 can result in relative movement between the pulley segments 150 and the receiving disk 124. This relative movement can cause chatter and/or noise and may increase wear on the pulley segments 150 and/or the receiving disk 124. The mating features 170b and the securing features 172 resist this relative movement, which can help to reduce chatter and/or wear.

When the complimentary mating feature 174 is engaged with the mating feature 170b during rotational operation of the second pulley 132, the securing feature 172 biases the complimentary mating feature 174 in the same direction as the endless member 118 biases the pulley segment 150 associated with the complimentary mating feature 174. Accordingly, the securing feature 172 can help to maintain the complimentary mating feature 174 in contact with the indexing surfaces 176, which can help to keep the secured pulley segment 150 aligned in the engaged region. As will be appreciated, this complementary biasing of the securing feature 172 and the endless member 118 can help to reduce relative movement between the secured pulley segment 150 and the receiving disk 124, which can help to reduce chatter and/or wear caused during rotational operation of the segmented pulley assembly.

Although the securing feature 172 is shown and described as biasing the complimentary mating feature 174 in the same direction as the endless member 118 biases the pulley segment 150 associated with the complimentary mating feature 174, it will be appreciated that in other embodiments the securing feature 172 may bias the complimentary mating feature 174 in a direction that is not the same as, or not complementary with, the direction the endless member 118 biases the pulley segment 150. In such other embodiments, the securing feature 172 may bias the complimentary mating feature with sufficient force that the complimentary mating feature 174 is kept in contact with the indexing surfaces 176 and the secured pulley segment 150 is kept aligned in the engaged region, regardless of the bias of the endless member 118 on the secured pulley segment 150.

Although the first pulley system 122 has been shown and described herein as comprising two concentric pulleys, namely the first pulley 130 and the second pulley 132, it will be appreciated that in other embodiments the first pulley system may comprise a greater number of concentric pulleys when further ratios for the segmented pulley transmission 120 are desired.

Although each of the mating features 170a, 170b have been shown and described herein as holes that extend through the receiving disk and each of the complimentary mating features 174 has been shown and described as a distal tip of the connecting rods 152, it will be appreciated that in other embodiments the mating features and the complimentary mating features may be different suitable configurations. In some embodiments, the mating features may include recesses in the receiving disk that extend from the pulley facing side 162 towards the rear side 164 and that are configured to engage protrusions formed on the pulley segments, or secured to the pulley segments. In yet other embodiments, the mating features may include protrusions formed on the receiving disk and extending towards the pulley segments and the complimentary mating features may include recesses formed in the pulley segments for receiving the protrusions.

Although the receiving disk 124 has been shown and described above as comprising five mating features 170a and five mating features 170b, in other embodiments the receiving disk may include a different number of mating features. In some embodiments, the receiving disk 124 may include a single mating feature that is continuous across the pulley facing side 162 of the body 160. The single mating feature may be configured to engage all of the complimentary mating features 174, when the associated pulley segments 150 are in the engaged region.

Although the receiving disk 124 has been shown and described as having mating features 170a, 170b with two different configurations, it will be appreciated that in some embodiments, all of the mating features may be the same configuration as the mating features 170b described herein and the receiving disk may include a securing features 172 for each of the mating features 170b. Each of the securing features 172 may be being integrally formed with a respective one of the mating features 170b.

Although embodiments have been described above and are shown in the accompanying drawings, it will be appreciated by those skilled in the art that variations and modifications may be made without departing from the scope as defined by the appended claims, and the scope of the claims should be given the broadest interpretation consistent with the specification as a whole.

What is claimed is:

1. A receiving disk for a segmented pulley transmission, the receiving disk comprising:
    a generally circular body having a pulley facing side and a rear side, opposite the pulley facing side;
    at least one mating feature located at the pulley facing side of the body, the mating feature being configured to engage a complimentary mating feature associated with a pulley segment of the segmented pulley transmission, when the pulley segment is in an engaged region; and
    at least one securing feature located in proximity to the mating feature and configured to secure the complimentary mating feature, when the complimentary mating feature is engaged with the mating feature,
    wherein the mating feature defines at least one indexing surface for engaging the complimentary mating feature,
    wherein the indexing surface is configured to contact the complimentary mating feature and align the pulley segment in the engaged region, and
    wherein the securing feature is configured to bias the complimentary mating feature towards the indexing surface to secure the complimentary mating feature.

2. The receiving disk of claim 1, wherein the mating feature comprises a hole formed in the body that extends from the pulley facing side to the rear side.

3. The receiving disk of claim 1, wherein the securing feature biases the complimentary mating feature towards the indexing surface in at least one of a generally radially inward direction and a generally circumferentially forward direction.

4. The receiving disk of claim 1, wherein the securing feature comprises at least one biasing member for biasing the pulley segment towards the indexing surface.

5. The receiving disk of claim 1, wherein the securing feature is integrally formed with the mating feature.

6. The receiving disk of claim 1, wherein the complimentary mating feature is integrally formed on a surface of the pulley segment.

7. The receiving disk of claim 1, wherein the complimentary mating feature is coupled to the pulley segment.

8. The receiving disk of claim 7, wherein the complimentary mating feature is located on connecting structure that is coupled to the pulley segment.

9. The receiving disk of claim 8, wherein the connecting structure comprises a connecting rod that is secured to the pulley segment and wherein the complimentary mating feature is a distal tip of the connecting rod.

10. The receiving disk of claim 1, wherein the receiving disk comprises a plurality of the mating features configured to engage a plurality of the complimentary mating feature associated with a plurality of the pulley segments of the segmented pulley transmission, wherein the receiving disk further comprises a plurality of the securing features and wherein each of the securing features is located in proximity to a respective one of the mating features in the plurality of mating features.

11. The receiving disk of claim 1, wherein the securing feature does not bias the complimentary mating feature toward the indexing surface when the pulley segment is in a disengaged region.

12. A segmented pulley transmission for rotationally coupling a first rotatable member and a second rotatable member, the segmented pulley transmission comprising:
    a first pulley assembly for coupling to the first rotatable member, the first pulley assembly comprising a first pulley and a second pulley concentric with the first pulley, the second pulley being a segmented pulley having a plurality of pulley segments that are individually moveable between an engaged region and a disengaged region;
    a second pulley assembly for coupling to the second rotatable member and spaced apart from the first pulley assembly;
    an endless member engaging the first pulley assembly and the second pulley assembly and extending therebetween, to rotationally couple the first pulley assembly and the second pulley assembly; and
    a receiving disk as defined in claim 1 for engaging and securing the plurality of pulley segments, when the pulley segments are located in the engaged region.

13. The segmented pulley transmission of claim 12, further comprising an idler pulley engaging the endless member and configured to control slack in the endless member.

14. The segmented pulley transmission of claim 12, further comprising an actuator coupled to the plurality of pulley segments and configured to sequentially move the plurality of pulley segments between the engaged region and the disengaged region, to transition the endless member between the first pulley and the second pulley.

15. The segmented pulley transmission of claim 12, wherein the securing feature does not bias the complimentary mating feature toward the indexing surface when the pulley segment is in the disengaged region.

* * * * *